United States Patent [19]

Morgan et al.

[11] 3,997,493
[45] Dec. 14, 1976

[54] HIGH FLASH POINT OIL-EXTENDED RUBBER

[75] Inventors: Albert W. Morgan, Collinsville, Ill.; Roland G. Ribaudo, St. Louis, Mo.

[73] Assignee: Monsanto Company, St. Louis, Mo.

[22] Filed: Sept. 22, 1975

[21] Appl. No.: 615,619

Related U.S. Application Data

[63] Continuation-in-part of Ser. No. 495,617, Aug. 8, 1974, abandoned, which is a continuation of Ser. No. 203,859, Dec. 1, 1971, abandoned.

[52] U.S. Cl. .................. 260/29.7 GP; 106/15 FP; 252/56 R; 252/56 P; 260/33.6 AQ; 260/730; 260/746; 260/759; 260/DIG. 24

[51] Int. Cl.² ................ C08K 5/01; C08L 7/00; C08K 17/00

[58] Field of Search ............ 106/15 FP; 252/56 R, 252/56 D, 29.7 GP, 33.6 AQ, 45.85 T, 759, DIG. 24; 260/730, 746

[56] References Cited

UNITED STATES PATENTS

| | | | |
|---|---|---|---|
| 3,239,478 | 3/1966 | Harlan | 260/33.6 AQ |
| 3,503,911 | 3/1970 | Goldemberg | 260/33.6 AQ |

*Primary Examiner*—Lewis T. Jacobs
*Assistant Examiner*—H. H. Fletcher
*Attorney, Agent, or Firm*—Robert E. Wexler

[57] ABSTRACT

Viscosity index modifiers are added to oil-extended, flame-retarded rubber to increase the flash point of the extending oil and enhance the effects of the flame retardant and thereby lower the flammability of the rubber composition. The modifiers have an aliphatic nonpolar backbone containing pendant carboxyl groups.

22 Claims, No Drawings

HIGH FLASH POINT OIL-EXTENDED RUBBER

CROSS REFERENCES TO RELATED APPLICATIONS

This application is a continuation-in-part of application Ser. No. 495,617, filed Aug. 8, 1974, which is a continuation of application Ser. No. 203,859, filed Dec. 1, 1971, both now abandoned.

BACKGROUND OF THE INVENTION

This invention relates to natural and synthetic rubbers and, in particular, such rubbers which have been extended with oil. Specifically, the invention relates to oil-extended rubbers, and to compositions thereof containing a flame retardant which include viscosity index modifiers and to the use of such modifiers in enhancing the flame retardant characteristics of oil-extended rubber.

Prior to the introduction of synthetic rubber during World War II, vegetable and mineral oils and similar materials had been used in small amounts in the processing of natural rubbers. In this particular application, a small amount of the oil was added to the rubber in its latex form as a softening agent to reduce power consumed in the mixing and mastication of the rubber mass.

The short supply of rubber and the introduction of synthetic rubbers during World War II brought a number of new problems to the rubber industry and necessitated much work before the synthetic rubbers could be used successfully. Many of these problems involved modifiers and extenders for the new rubbers and for formulations involving admixtures of the new rubbers with natural rubber.

From the standpoint of processing ease, it was determined that the addition of oils, such as those previously employed as softeners or plasticizers, reduced the Mooney viscosity to the desired extent and had no detrimental effect on the physical properties of the product. It was also found that these processing oils could be used in amounts far in excess of the amounts normally used in softening and plasticizing to replace a certain amount of the synthetic polymer and thus "extend" the polymer.

The use of oils of petroleum origin as extenders for natural rubber and synthetic elastomers was first proposed in 1936. The first product introduced for this purpose was a petroleum oil recovered from the acid sludge produced in the treatment of petroleum oils with sulfuric acid. This material was used commercially as a rubber extender just before and during World War II. A number of petroleum oil extenders have since appeared on the market. Naphthenic oils as well as highly aromatic oils, such as extracts from the solvent extraction of lubricating oils, are used commercially.

It has been recently found that such extending oils, while of inestimable value to the rubber industry, contribute to the flammability of the rubber composition. Thus, at higher processing temperatures the oil has a low flash point and causes quick ignition of the rubber composition. This problem is especially severe in sponge rubber systems.

The flammability of oil-extended rubber compositions, even those containing conventional flame retardants, has caused increased concern with the advent of greater amounts of such rubber compositions being used in upholstery and carpeting compositions. Accordingly, there is a need for imparting flame retardant characteristics to oil-extended rubber compositions.

SUMMARY OF THE INVENTION

In view of the above, it has now been unexpectedly found that the addition of viscosity index modifiers to conventionally flame-retarded, oil-extended rubber enhances the functionality and effectiveness of the flame retardant system and also acts to lower the flash point of the extending oil at processing temperatures.

In accordance with this invention, the flame retardant characteristics of flame-retarded, oil-extended rubber compositions are enhanced by incorporating therein an effective amount of a viscosity index modifier which acts to increase the effectiveness of the flame retardant system by keeping the viscosity of the oil higher at high temperatures, thereby raising the flash point of the oil and thus reducing the flammability characteristics of the oil-extended rubber composition.

The term "rubber" as used herein embraces both natural rubber and all its various raw and reclaimed forms as well as various synthetic rubbers, i.e., rubber polymers of the type which may be vulcanized with sulfur or other vulcanizing agents. Representative synthetic rubbery polymers of this variety are the homopolymerization products of butadiene and its homologs and derivatives, as for example, methylbutadiene, dimethyl butadiene, pentadiene and chloroprene (neoprene synthetic rubber), as well as copolymers such as those formed from butadiene, or its homologs or derivatives, with other unsaturated organic compounds. Among the latter are acetylenes, e.g. vinyl acetylene; olefins, e.g., isobutylene which copolymerizes with butadiene to form butyl rubber; vinyl compounds, e.g., vinyl chloride, acrylic acid, acrylonitrile (which polymerizes with butadiene to form Buna N rubber), methacrylic acid and styrene, the latter compound polymerizing with butadiene to form Buna-S rubber, as well as vinyl esters and various unsaturated aldehydes, ketones and ethers, e.g., acrolein, methyl isopropenyl ketone and vinyl ethyl ether. Also included, are the various synthetic rubbers prepared from the homopolymerization of isoprene and the copolymerization of isoprene with other diolefins and various unsaturated organic compounds. Additionally included are the synthetic rubbers prepared from 1,4-cis-polybutadiene and 1,4-cis-polyisoprene and similar synthetic rubbers which have been developed in recent years.

The extender oils which may be incorporated with such rubbers are any of those extender oils which are conventionally used in the rubber industry. Extender oils of particular utility are largely composed of naphthenic and alkylated naphthenic hydrocarbons and mixtures thereof with various aromatic hydrocarbons. Such oils may be obtained from the high boiling fractions of the so-called naphthenic or mixed based crude oils such as Mid Continent, Louisiana, East Texas, and similar crude oils. They may comprise distillate fractions boiling above about 200° C. Suitable fractions are those at least 90 percent of which boil above about 250° C. More volatile members may be lost during or after compounding and curing the rubber. The oil is preferably free of waxes and asphaltenes for most purposes. It may comprise the raffinate from solvent extraction of topped or reduced crude oils or other high boiling, straight-run petroleum fractions, e.g., distillates, the 10 percent and 90 percent points of which lie in the range of about 250° C. to 400° C. The extender oils are used at high concentration levels, with typical loadings of 37.5 phr (parts per hundred parts of rubber) to 75 phr and higher being used commercially.

The American Society for Testing Materials has adopted a method for classifying extender oils based on chemical tests. These tests for characteristic groups are based on methods which have become well established in the rubber industry. The procedure used is the Clay-Gel Method (ASTM D1007) or the Precipitation Method (ASTM D1006). Either method may be employed. The oils are classified into four types as follows:

| Type | Asphaltenes | Polar Compounds | Saturates |
|------|-------------|-----------------|-----------|
| 101  | 0.75% max   | 25% max         | 20% max   |
| 102  | 0.50% max   | 12% max         | 20.1 to 35% |
| 103  | 0.30% max   | 6% max          | 35.1 to 65% |
| 104  | 0.10% max   | 1% max          | 65% min   |

The viscosity index modifiers which are used in accordance with this invention have the common characteristic of enhancing the effect of conventional flame retardants and of increasing the viscosity index of extender oils at high processing temperatures while having no effect on the viscosity of such extender oils or on the viscosity of the rubber composition at normal use temperatures. The viscosity index modifiers are high viscosity liquids having an aliphatic, non-polar backbone and containing pendant carboxyl groups. Thus, the materials are aliphatic acids and anhydrides and esters thereof, including anhydrides and esters of polyacids. Typical viscosity index modifiers used in accordance with this invention are "MODAFLOW" (Monsanto Co.), a complex polymeric viscous liquid having a viscosity (S.F.S. at 210° F.) of approximately 800–3500 cks. and a specific gravity (60/60° F.) of 0.99–1.03 (this material is further described in Monsanto Technical Bulletin O PL-338). Additional viscosity modifiers include polybutenyl succinic anhydride and esters thereof, polyacrylic acid esters, resin mixtures of polyethylene with maleic anhydride and esters thereof and of poly(vinyl ether/maleic anhydride) and of maleic esters with poly(vinyl ethers), acrylic acid polymers and acrylic esters.

The viscosity index modifiers are used at a concentration of about 0.05 to about 5.0 parts per hundred parts rubber, preferably from about 0.25 to about 3.0 parts per hundred parts rubber.

The viscosity index modifiers used in accordance with this invention may be incorporated into the blending oil prior to its being blended with rubber stock or the modifier may be incorporated directly into the rubber stock either before or after incorporation of the extender oil.

Conventional flame retardant materials which are widely used include halogenated and non-halogenated phosphorus acid esters, e.g., cresyl diphenyl phosphate, tris-$\beta$-chloroethyl phosphate, metal salts, oxides and hydrate, e.g. magnesium carbonate, antimony oxide, alumina hydrate, metal borates, ammonium salts and halogenated organic compounds of widely diverse nature such as halogenated aliphatic and arromatic hydrocarbons, and mixtures thereof.

The following example will serve to illustrate certain specific embodiments with the scope of this invention and is not to be construed as a limitation thereof.

EXAMPLE

The following masterbatch is prepared:

| Ingredient | Parts by Weight |
|------------|-----------------|
| SBR rubber | 100.0 |
| Stearic acid | 5.3 |
| Whiting | 30.0 |
| Clay | 65.0 |
| Sulfur | 3.7 |
| Zinc oxide | 5.0 |
| TMTD[1] | 2.0 |
| MBT[2] | 2.5 |
| "Celogen"[3] | 2.2 |
| Sodium carbonate | 4.0 |
| Titanium dioxide | 6.0 |
| Alumina hydrate | 125.0 |
| "Aroclor 5460"[4] | 12.0 |
| Cresyl diphenyl phosphate | 30.0 |
| "Admex 710"[5] | 4.0 |
| Urea | 4.0 |
| Oil[6] | 34.0 |
|  | 434.7 |

[1]Tetramethyl thiuram disulfide
[2]2-Mercaptobenzothiazole
[3]p.p'-Oxybis-(benzenesulfonyl hydrazide)
[4]Halogenated polyphenyl
[5]Epoxidized soybean oil
[6]1200 sec$^{-1}$ viscosity naphthenic processing oil The masterbatch is prepared by banding the rubber on a two-roll mill for two minutes or until the stock reaches a temperature of 120° F. The solid and liquid additives are blended in a beaker and added to the branded stock in increments while keeping the temperature below 140° F. After the additives are thoroughly blended, the masterbatch is sheeted off at a stock thickness of about ⅛ to about ¼ inch.

Eleven samples of the masterbatch, each sample comprising six replicates, are prepared. To each of the replicates there is added 30 g. of naphthenic extending oil and varying amounts of viscosity index modifiers. The replicate mixtures are Banburyed, sheeted at ⅜ inch on the mill and cured for five minutes at 385° F.

The eleven samples (of six replicates each) are exposed to the SBR Vertical Burn Test. In such test, a replicate sample measuring one inch wide by twelve inches long is vertically mounted in a cabinet. The bottom end of the replicate is exposed for twelve seconds to a 1½ inch flame from a ⅜ inch diameter barrel Bunsen Burner supplied with natural gas. The sample should not burn over a maximum of 90 seconds.

In the table below, the "seconds to flame out" for each of the eleven samples represents the average "seconds to flame out" of the six replicates of each sample.

TABLE

| Ingredients (grams) | Control | 1 | 2 | 3 | 4 | 5 | 6 | 7 | 8 | 9 | 10 | 11 |
|---------------------|---------|------|------|------|------|------|------|------|------|------|------|------|
| Masterbatch | 434.7 | 434.7 | 434.7 | 434.7 | 434.7 | 434.7 | 434.7 | 434.7 | 434.7 | 434.7 | 434.7 | 434.7 |
| Acryloid 710[1] | — | 0.64 |  |  |  |  | 1.28 | 0.32 |  |  |  |  |
| SANTOLUBE 900[2] | — |  | 0.64 |  |  |  |  |  | 1.28 | 0.32 |  |  |
| PBSA[3] | — |  |  | 0.64 |  |  |  |  |  |  | 1.28 | 0.32 |
| PBSAE[4] | — |  |  |  | 0.64 |  |  |  |  |  |  |  |

TABLE-continued

| Ingredients (grams) | Control | 1 | 2 | 3 | 4 | 5 | 6 | 7 | 8 | 9 | 10 | 11 |
|---|---|---|---|---|---|---|---|---|---|---|---|---|
| MODAFLOW[5] | — | | | | | 0.64 | | | | | | |
| Seconds to flame out | * | 47 | 16 | 20 | 7 | 2 | 60 | 2 | 33 | 1 | 25 | 50 |

*Did not self-extinguish
[1]Polyacrylic acid ester
[2]Polybutenyl succinic anhydride ester
[3]Polybutenyl succinic anhydride
[4]Polybutenyl succinic anhydride ester
[5]Liquid acrylic resin The above data illustrate the remarkably increased flame retardant characteristics of oil-extended, flame-retarded SBR rubber containing viscosity modifiers in accordance with this invention.

Comparable results are attained when using the viscosity index modifiers in the Table throughout the range of from about 0.05 to about 5.0 parts modifier to 100 parts rubber. The effectiveness of the modifiers is greatest at low concentrations, decreases rapidly at middle and higher concentrations. Even at lowest effectiveness, however, samples pass the SBR Vertical Burn Test (i.e. the samples do not burn over a maximum of 90 seconds) in contrast to the Control which did not self-extinguish.

Although effective at about 0.05 to about 5.0 phr, preferably about 0.25 to about 3.0 phr, the specific concentration of modifier in a particular rubber must be judged in relation to the use for the rubber. Thus, it may be desirable to use higher levels of modifier in a particular rubber to achieve high temperature viscosity goals, even though the modifier may be less effective in increasing the flame retardant characteristics at such higher levels than when used at lower levels.

Similar results are attained when oil-extended and flame retarded SBR rubber is replaced by other oil-extended, flame retarded rubbers, such as butyl rubber, polymers of isoprene, butadiene and chloroprene, nitrile rubber, isoprene/acrylonitrile rubber, polisoolefins such as polyisobutylene and natural rubber as well as natural and synthetic rubber latices.

While the invention has been described hereinabove with regard to certain illustrative specific embodiments, it is not so limited since many modifications and variations are possible in light of the above teachings. It is understood therefore that the invention may be practiced otherwise than as specifically described without departing from the spirit and scope of the invention.

The embodiments of the invention in which an exclusive property or privilege is claimed are defined as follows:

1. A composition comprising (A) a rubber, (B) at least about 37.5 phr of an extender oil for said rubber, (C) a flame retardant and (D) from about 0.05 to about 5.0 phr of a high viscosity liquid viscosity index modifier for said extender oil, said modifier having an aliphatic non-polar backbone containing pendant carboxyl groups wherein the composition does not burn over a maximum of 90 seconds in the SBR Vertical Burn Test.

2. Composition of claim 1 wherein said oil comprises naphthenic and alkylated hydrocarbons and mixtures thereof with aromatic hydrocarbons.

3. Composition of claim 2 wherein said oil is selected from the group consisting of ASTM Type 101, ASTM Type 102, ASTM Type 103 or ASTM Type 104 and mixtures thereof.

4. Composition of claim 1 wherein said rubber is selected from the group consisting of synthetic rubber and natural rubber and its raw, latex and reclaimed forms.

5. Composition of claim 4 wherein said rubber is selected from the group consisting of natural rubber, homopolymerization products of butadiene and homologs thereof and copolymerization products of butadiene and homologs thereof with acetylenes, olefins, vinyl halides, acrylic acid and derivatives thereof, vinyl aromatics, vinyl esters and unsaturated aldehydes, ketones and ethers.

6. Composition of claim 5 wherein said rubber is a styrene-butadiene copolymer.

7. Composition of claim 1 wherein said flame retardant is selected from the groups consisting of halogenated and nonhalogenated phosphorous acid esters, metal salts, oxides, hydrates and borates, ammonium salts and halogenated organic aliphatic and aromatic hydrocarbons and mixtures thereof.

8. Composition of claim 1 wherein said modifier is selected from the group consisting of aliphatic polyacids and the anyhydrides and esters thereof and mixtures thereof.

9. Composition of claim 8 wherein said modifier is selected from the group consisting of polyacrylic acid esters and polybutenyl succinic anhydride and esters thereof.

10. Composition of claim 1 wherein said modifier is present in an amount of from about 0.25 to about 3.0 phr.

11. Composition of claim 10 wherein said modifier is present in an amount of from about 0.32 to about 1.28 phr.

12. Method of enhancing the effects of a flame retardant in an oil-extended rubber composition containing at least about 37.5 phr extender oil which comprises adding from about 0.05 to about 5.0 phr of a high viscosity liquid viscosity index modifier for said oil to said composition, said modifier having an aliphatic non-polar backbone containing pendant carboxyl groups wherein the composition does not burn over a maximum of 90 seconds in the SBR Vertical Burn Test.

13. Method of claim 12 wherein said oil comprises naphthenic and alkylated hydrocarbons and mixtures thereof with aromatic hydrocarbons.

14. Method of claim 13 wherein said oil is selected from the group consisting of ASTM Type 101, ASTM Type 102, ASTM Type 103 or ASTM Type 104 and mixtures thereof.

15. Method of claim 12 wherein said rubber is selected from the group consisting of synthetic rubber and natural rubber and its, raw, latex and reclaimed forms.

16. Method of claim 15 wherein said rubber is selected from the group consisting of natural rubber, homopolymerization products of butadiene and homologs thereof and copolymerization products of butadiene and homologs thereof with acetylene, olefins, vinyl halides, acrylic acid and derivatives thereof, vinyl aromatics, vinyl esters and unsaturated aldehydes, ketones and eters.

17. Method of claim 16 wherein said rubber is a styrene-butadiene copolymer.

18. Method of claim 12 wherein said flame retardant is selected from the group consisting of halogenated and non-halogenated phosphorus acid esters, metal salts, oxides, hydrates and borates, ammonium salts and halogenated organic aliphatic and aromatic hydrocarbons and mixtures thereof.

19. Method of claim 12 wherein said modifier is selected from the group consisting of aliphatic polyacids and the anhydrides and esters thereof and mixtures thereof.

20. Method of claim 19 wherein said modifier is selected from the group consisting of polyacrylic acid esters and polybutenyl succinic anhyride and esters thereof.

21. Method of claim 12 wherein said modifier is present in an amount of from about 0.25 to about 3.0 phr.

22. Method of claim 21 wherein said modifier is present in an amount of from about 0.32 to about 1.28 phr.

* * * * *

UNITED STATES PATENT OFFICE
CERTIFICATE OF CORRECTION

Patent No. 3,997,493　　　　　Dated December 14, 1976

Inventor(s) Albert W. Morgan et al.

It is certified that error appears in the above-identified patent and that said Letters Patent are hereby corrected as shown below:

Column 6, Claim 7, line 3, "nated and nonhalogenated phosphorous acid esters," shuuld read -- nated and nonhalogenated phosphorus acid esters, --.

Column 7, Claim 16, last line "and eters," should read -- and ethers. --.

Signed and Sealed this

Nineteenth Day of April 1977

[SEAL]

Attest:

RUTH C. MASON
Attesting Officer

C. MARSHALL DANN
Commissioner of Patents and Trademarks